(12) United States Patent
Army et al.

(10) Patent No.: US 9,056,276 B2
(45) Date of Patent: Jun. 16, 2015

(54) OZONE CONVERTER WITH INTERNAL BYPASS

(75) Inventors: Donald E. Army, Enfield, CT (US); Frederick Peacos, III, North Scituate, RI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 839 days.

(21) Appl. No.: 13/274,982

(22) Filed: Oct. 17, 2011

(65) Prior Publication Data

US 2013/0094999 A1 Apr. 18, 2013

(51) Int. Cl.
| | |
|---|---|
| *B01D 53/86* | (2006.01) |
| *C01B 13/02* | (2006.01) |
| *B64D 13/00* | (2006.01) |
| *B64D 13/06* | (2006.01) |

(52) U.S. Cl.
CPC ............ *B01D 53/8675* (2013.01); *B64D 13/00* (2013.01); *B01D 2259/4575* (2013.01); *B64D 2013/0685* (2013.01); *B01D 2258/06* (2013.01); *C01B 13/0203* (2013.01)

(58) Field of Classification Search
CPC ........... B64D 13/06; B64D 2013/0685; B01D 53/8675; B01D 2258/06; C01B 13/0203
USPC ................ 422/120, 122; 137/599.01, 599.11, 137/601.01, 601.17, 607, 614.01
See application file for complete search history.

(56) References Cited

U.S. PATENT DOCUMENTS

| | | |
|---|---|---|
| 3,269,801 A | 8/1966 | Boberg |
| 2005/0214186 A1 | 9/2005 | Michalakos et al. |
| 2010/0158775 A1 | 6/2010 | Galligan et al. |

FOREIGN PATENT DOCUMENTS

| | | |
|---|---|---|
| WO | 8101250 A1 | 5/1981 |
| WO | 9403265 A1 | 2/1994 |

OTHER PUBLICATIONS

Canadian Office Action dated Aug. 26, 2013 for Application No. 2,792,195 pp. 1-2.
European Search Report for Application No. 12188716.0-2113. Mailed on Jan. 13, 2013.

*Primary Examiner* — Timothy Cleveland
(74) *Attorney, Agent, or Firm* — Cantor Colburn LLP

(57) ABSTRACT

An ozone converter that includes an outer housing having an inlet and an outlet is disclosed. In this embodiment the ozone converter includes a core disposed within the outer housing and a bypass cylinder disposed between the inlet and the outlet and that passes through the core such that air within the bypass cylinder does not contact the core. The ozone converter of this embodiment also includes a blocking sleeve that surrounds a portion of the bypass cylinder and that is moveable from a first position to a second position. When the bypass sleeve is in the first position air that enters in the inlet is directed by the blocking sleeve into the bypass cylinder and when it is in the second position air that enters the inlet is allowed to enter an outer passage between the bypass cylinder and the outer housing.

6 Claims, 3 Drawing Sheets

OZONE CONVERTER WITH INTERNAL BYPASS

BACKGROUND OF THE INVENTION

The subject matter disclosed herein relates to an ozone converter and in particular to an ozone converter for use with an aircraft environmental control system.

Aircraft have power systems that are comprised of several components, such as an engine, an environmental control system and a thermal management system. These systems are designed relatively independently from each other with power being transferred from one system to another.

The environmental control system supplies pressurized air to the cabin and flight deck of an aircraft. The ambient air is drawn either from the compressor stage of an engine (a bleed air system) or a dedicated compressor. At high altitude (e.g., greater than 20,000 ft (6096 m)), the ambient air contains unacceptable levels of ozone ($O_3$). Passenger comfort and/or compliance with regulations or agreements can limit the amount of ozone provided to the cabin and flight deck. As such, commercial aircraft generally include an ozone converter that converts ozone to oxygen ($O_2$).

Ozone converters typically include an ozone-converting core (core) that includes a catalyst which causes the ozone to decompose to oxygen. To minimize the core's exposure to contamination and extend the life of the converter, air is externally bypassed around the converter when the aircraft is at low altitude. However, in some cases, there is no space available to incorporate an external bypass.

BRIEF DESCRIPTION OF THE INVENTION

According to one embodiment, an ozone converter that includes an outer housing having an inlet and an outlet is disclosed. In this embodiment the ozone converter includes a core disposed within the outer housing and a bypass cylinder disposed between the inlet and the outlet and that passes through the core such that air within the bypass cylinder does not contact the core. The ozone converter of this embodiment also includes a blocking sleeve that surrounds a portion of the bypass cylinder and that is moveable from a first position to a second position. When the bypass sleeve is in the first position air that enters in the inlet is directed by the blocking sleeve into the bypass cylinder and when it is in the second position air that enters the inlet is allowed to enter an outer passage between the bypass cylinder and the outer housing.

According to another embodiment, an ozone converter that includes an outer housing having an inlet and an outlet, a core disposed within the outer housing and a bypass cylinder disposed between the inlet and the outlet and that passes through the core such that air within the bypass cylinder does not contact the core is disclosed. The blocking element of this embodiment further includes a blocking element disposed within the bypass cylinder and moveable from a first position to a second position, the blocking element being disposed such that it at least partially blocks air from traveling through the bypass cylinder when in the first position.

According to yet another embodiment, a system that includes a source of input air, one or more air parameter adjusting devices that change one or both of the temperature and pressure of the input air to produce conditioned air and an ozone converter that reduces the ozone content of the conditioned air to produce output air is disclosed. In this embodiment, the ozone converter includes an outer housing having an inlet and an outlet, a core disposed within the outer housing, and a bypass cylinder disposed between the inlet and the outlet and that passes through the core such that air within the bypass cylinder does not contact the core. In this embodiment, the core includes a blocking element disposed within the bypass cylinder and moveable from a first position to a second position, the blocking element being disposed such that it at least partially blocks air from traveling through the bypass cylinder when in the first position.

BRIEF DESCRIPTION OF THE DRAWINGS

The subject matter which is regarded as the invention is particularly pointed out and distinctly claimed in the claims included at the conclusion of the specification. The foregoing and other features, and advantages of the invention are apparent from the following detailed description taken in conjunction with the accompanying drawings in which:

DETAILED DESCRIPTION OF THE INVENTION

Figure 1:
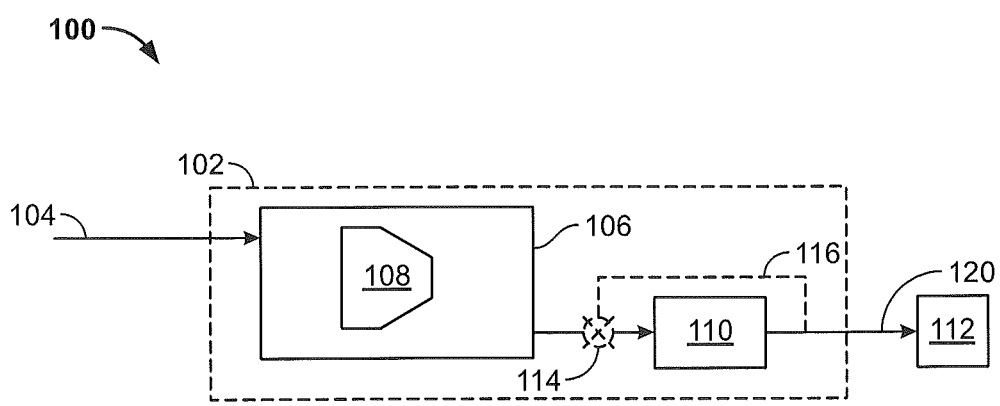
FIG. 1 is a block diagram illustrating a system in which embodiments of the present invention can be implemented.

FIG. 1 illustrates a system 100 in which embodiments of the present invention may be implemented. The system 100 can be part of an aircraft or any other type of apparatus that can cause the system 100 to be moved in a forward direction. For clarity, the following description will assume that the system 100 is part of an aircraft but it is not so limited.

The system 100 illustrated in FIG. 1 includes an environmental control system (ECS) 102. The ECS 102 receives input air 104 and provides output air 120 to a location 112 within an apparatus. For example, the location 112 could be the flight deck or passenger compartment of an aircraft. It shall be understood that the ECS 102 shown in FIG. 1 is extremely simplified and could include many other or different elements.

As illustrated, the ECS 102 includes an air parameter adjusting unit 106. The air parameter adjusting unit 106, generally, converts the pressure and/or temperature of the input air 104 to a desired level. In one embodiment, the input air 104 is bleed air from a compressor section of an engine. In another embodiment, the input air 104 is ram air received directly from the atmosphere. Regardless of the source of the input air 104, the air parameter adjusting unit 106 may include a parameter adjustment device 108 that can be operated to adjust the temperature/pressure of the input air 104. The parameter adjustment device 108 includes a turbine and/or a compressor. In one embodiment, the parameter adjustment device 108 is an electric compressor that compresses ram air.

If the input air 104 is received while the aircraft is at high altitude, there may a requirement (e.g., contractual or regulatory) that ozone be removed from the input air 104 before being provided to location 112 as output air 120. To that end, the ECS 102 also includes an ozone converter 110 coupled between the air parameter adjusting unit 106 and the location 112. The exact location of the ozone converter 110 can be varied from that shown in FIG. 1 in different embodiments of the present invention.

As discussed above, in some cases it may be desirable to bypass the ozone converter 110 when the ECS 102 receives input air 104 from a low altitude source. To accomplish this, one prior art approach was to include bypass line 116 and diverter 114 that caused the input air 104 to be bypassed around the ozone converter 110. In FIG. 1, bypass line 116 and diverter 114 are shown in dashed line to indicate that they are not required (or even desired) components of the ECS 102 according to one embodiment.

Embodiments of the present invention are directed to an ozone converter 110 that can be used in the system 100. According to one embodiment, the ozone converter 110 includes an internal bypass that allows air to bypass the ozone converter's core without requiring a separate external bypass (e.g., without requiring either diverter 114 or bypass line 116). Of course, the inclusion of diverter 114 or bypass line 116 into ECS 102 does not change the fact that any system that includes an ozone converter 110 as disclosed herein is within the scope of the present invention. In some cases, the ozone converter 110 can save space in ECS 102 because diverter 114 and bypass line 116 are not required. Removal of such elements may provide a space saving that exceeds any increase in size of the ozone converter 110 due to the provision on an internal bypass within the ozone converter 110 as disclosed herein.

Figure 2:
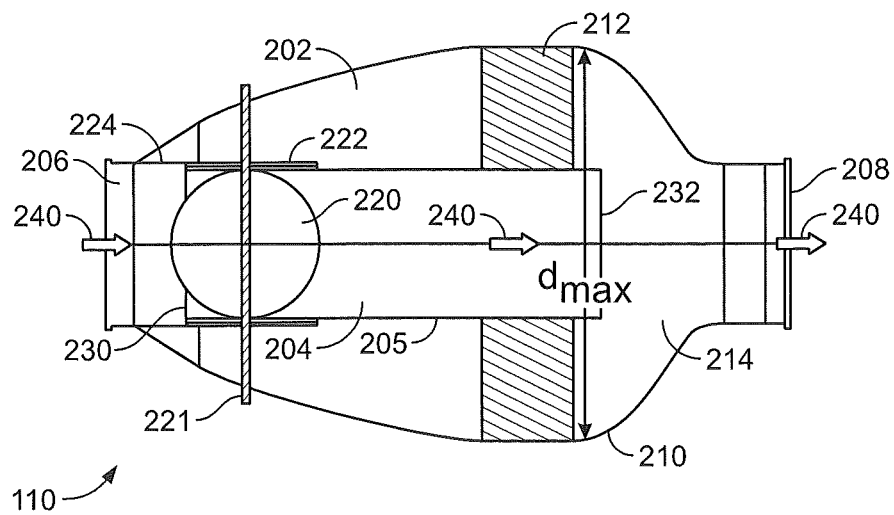
FIG. 2 is cut-away side view of an ozone converter having an internal bypass in the open position according to one embodiment of the present invention.

FIG. 2 illustrates an embodiment of an ozone converter 110 in the "open" or "bypass" state. The ozone converter 110 includes two separate air passages though which air can pass through it. In particular, the ozone converter 110 includes an outer passage 202 and an internal bypass 204. In this embodiment, the outer passage 202 surrounds at least a portion of the internal bypass 204.

The ozone converter 110 includes an inlet 206 and an outlet 208. Regardless of the state of the ozone converter 110, air enters at inlet 206 and exits at outlet 208. In the illustrated embodiment, the inlet 206 and outlet 208 are connected to one another by an exterior shell 210, which is also referred to as outer shell or outer housing 210. The term "downstream" as used herein related to components or locations shall refer to the order in which a substance (e.g. air) traverses the components. In particular, a component or location is downstream of another if air passes through the component or location after passing through the other component or location. For example, assuming air is flowing from left to right in FIG. 2, outlet 208 is downstream of inlet 206. Conversely, and in the same vein, inlet 206 is upstream of outlet 208.

Enclosed within the outer shell is a core 212. The core 212 can be formed of any type of material that causes or otherwise aids in the conversion of ozone into oxygen. For instance, in one embodiment, the core 212 is formed at least partially of palladium. In one embodiment, the internal bypass 204 passes through the core 212. That is, air that enters the internal bypass 204 can traverse from the inlet 206 to the outlet 208 without contacting the core 212. In one embodiment, the internal bypass 204 is arranged along a central axis 214 of the ozone converter 110 and has a generally cylindrical shape. A bypass cylinder 205 defines the internal bypass 204 in one embodiment.

The bypass cylinder 205 includes a blocking element 220 disposed therein. In one embodiment, the blocking element 220 is circular disc. The blocking element 220 can be translated from an open position where air can travel through the internal bypass 204 to a closed position where it blocks air from passing through internal bypass 204. As such, the blocking element 220 has area that is the same or nearly the same as an area of an inner diameter of the bypass cylinder 205 so that it can effectively block air from traveling through the bypass cylinder 205 when the ozone converter 110 is in the bypass state. In one embodiment, the translation from the open to closed position (and vice-versa) can be effected by rotation of a rod 221 to which the blocking element 220 is coupled. In combination, the rod 221 and the blocking element 220 form a butterfly valve. As illustrated, the rod 221 passes through the walls of the bypasses cylinder 205 at two locations.

In the illustrated embodiment, air is prevented from entering the outer passage 202 by a blocking sleeve 222 that surrounds a portion of the bypass cylinder 205 proximal the inlet 206. The blocking sleeve 222 is arranged such that when the blocking element 220 is in the open position (e.g., the ozone converter 110 is in the bypass state), the blocking sleeve 222 blocks air from entering an outer passage opening 224 that exists between the inlet 206 and an end 230 of the bypass cylinder 205. As generally described above, in one embodiment, the other end 232 of the bypass cylinder 205 extends to a location downstream of the core 212. It shall be understood, however, that the blocking sleeve 222 could be disposed within the bypass cylinder 205 in one embodiment. In FIG. 2, the path of air through the ozone converter 110 is shown by arrows 240.

Figure 3:
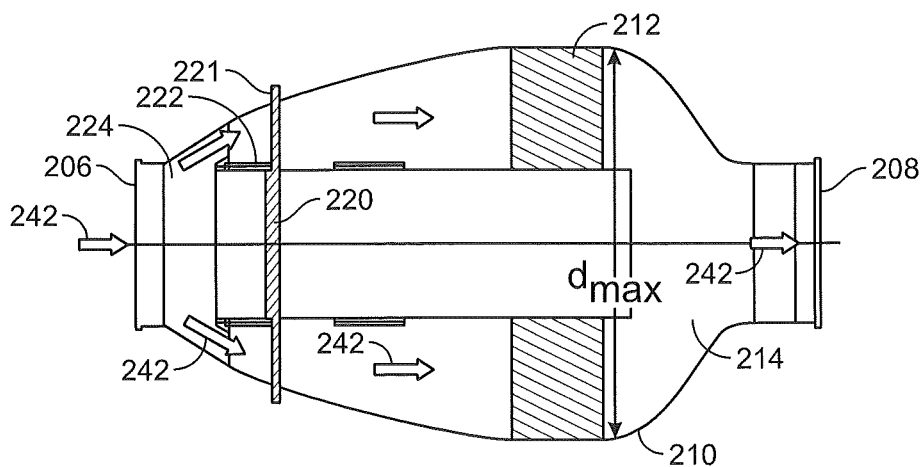
FIG. 3 is cut-away side view of an ozone converter having an internal bypass in the closed position according to one embodiment of the present invention.

Referring now to both FIGS. 2 and 3, as the rod 221 is rotated, the blocking element 220 translates from the open position (FIG. 2) to the closed position (FIG. 3). In addition, the blocking sleeve 222 is moved in the downstream direction such that air is allowed to enter outer passage 202 through outer passage opening 224. Thus, in FIG. 3, the air travels as illustrated by arrows 242 and contacts the core 212.

The outer shell 210 can take on any shape but in one embodiment, the outer shell 210 has a cross-sectional diameter (d) that increases from the inlet 206 to a maximal value $d_{max}$ at or downstream of the core 212. In one embodiment, the outer shell 210 decreases in diameter from the location downstream of the core 212 to the outlet 208. The increase in diameter causes the air to slow and increases the dwell time of the air in the core 212. The particular shaping of the shell 210 can be adjusted such that a desired dwell time of the air in the core 212 can be achieved.

Figure 4:
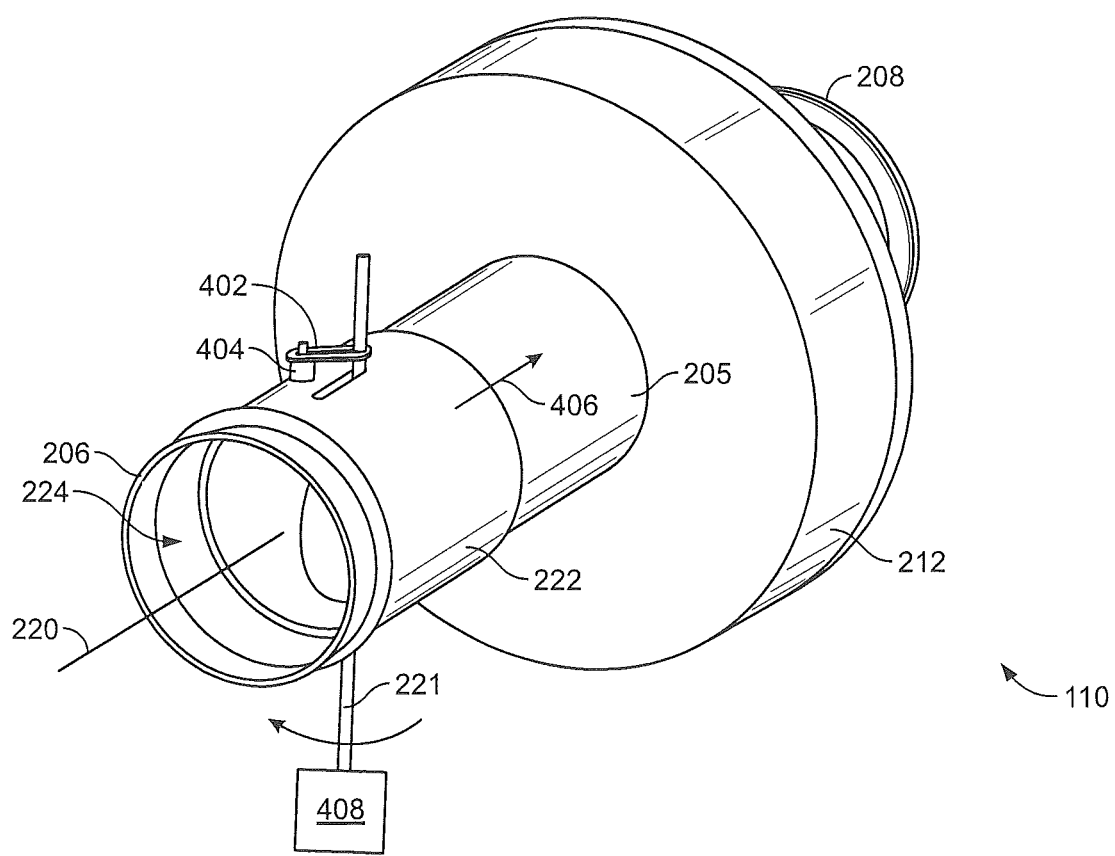
FIG. 4 is a perspective view of an ozone converter without its external shell to illustrate features of an ozone converter according to one embodiment.

FIG. 4 shows the ozone converter 110 without an outer shell. The converter 110 includes the same or similar components as those described above. In addition, the rod 221 is shown coupled to a rotary actuator 408. The rotary actuator 408 can impart rotary motion to the rod 221 to cause variation of the orientation of blocking element 220 to rotate from the open position shown in FIG. 2 to the closed position shown in FIG. 3.

In the illustrated embodiment, the rod 221 is coupled to the blocking sleeve 222 by a connection assembly. As illustrated, the rod 221 passes through then walls of the blocking sleeve 222 at two locations. The connection assembly includes a rod crank 402 that extends from and is fixedly attached to the rod 221. The rod crank 402 mates with a sleeve projection 404 that is fixedly attached to the blocking sleeve 222. While one orientation of a connection assembly is shown that includes rod crank 402 and sleeve projection 404, it shall be understood that other configurations can be utilized. In the illustrated embodiment, as the rod 221 is rotated (e.g., counter-clockwise as shown in FIG. 4), it causes rod crank 402 to impart motion in the direction shown by arrow 406 to blocking sleeve 222. This motion cause the blocking sleeve 222 to move away from the inlet 206 to expose outer passage opening 224 to allow air to flow in the manner shown in FIG. 3. As illustrates, the outer passage opening 224 is covered by blocking sleeve 222 so air flows through the bypass cylinder 205 and does not contact the core 212.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An ozone converter comprising:
   an outer housing having an inlet and an outlet;
   a core that converts ozone into oxygen via a catalytic reaction disposed within the outer housing;
   a bypass cylinder disposed between the inlet and the outlet and that passes through the core such that air within the bypass cylinder does not contact the core; and
   a blocking sleeve that surrounds a portion of the bypass cylinder and that is moveable from a first position to a second position, wherein in the first position air that enters in the inlet is directed by the blocking sleeve into the bypass cylinder and in the second position air that enters the inlet is allowed to enter an outer passage between the bypass cylinder and the outer housing.

2. The ozone converter of claim 1, wherein the outer housing has a cross-sectional diameter that increases from the position near the inlet to a maximum value at or near the core.

3. The ozone converter of claim 2, wherein the cross-sectional diameter decreases from the maximum value to a smaller value at the outlet.

4. The ozone converter of claim 1, wherein the core is formed at least partially of palladium.

5. The ozone converter of claim 1, further comprising:
   a blocking element disposed within the bypass cylinder, the blocking element being disposed such that it at least partially blocks air from traveling through the bypass cylinder when the blocking sleeve is in the second position.

6. The ozone converter of claim 5, further comprising:
   a rod passing through at least one wall of the bypass cylinder and coupled to the blocking element and that is operably connected to the blocking sleeve such that rotation of the rod in one direction causes the blocking sleeve to move from the first position to the second position.

* * * * *